United States Patent [19]

Günther et al.

[11] Patent Number: 4,925,887
[45] Date of Patent: May 15, 1990

[54] LATENT HARDENERS FOR MELAMINE RESIN MOULDING COMPOSITIONS

[75] Inventors: Peter Günther; Hermann O. Wirth, both of Bensheim; Wilhelm Endlich, Heppenheim, all of Fed. Rep. of Germany

[73] Assignee: Ciba-Geigy Corporation, Ardsley, N.Y.

[21] Appl. No.: 334,419

[22] Filed: Apr. 7, 1989

[30] Foreign Application Priority Data

Apr. 8, 1988 [CH] Switzerland .................. 1296/88

[51] Int. Cl.$^5$ .............................................. C08L 61/28
[52] U.S. Cl. ..................................... 524/14; 528/142; 528/211; 528/232; 524/398; 524/400; 524/423; 524/425; 524/447; 524/516; 524/509; 524/35
[58] Field of Search .............. 528/211, 142, 232; 524/14, 398, 400, 423, 425, 447

[56] References Cited

U.S. PATENT DOCUMENTS

| | | | |
|---|---|---|---|
| 2,785,149 | 3/1957 | Wohnsiedler . | |
| 3,317,474 | 5/1967 | Jones . | |
| 3,745,099 | 7/1973 | Szilagyi et al. | 204/55.1 |
| 4,115,366 | 9/1978 | Kellner | 528/131 |

OTHER PUBLICATIONS

Chem. Abst. 111201d.
Shell Fine Chemicals, Technical Bulletin, FC:64:1:TB, 2nd Ed.
Polimery (Warsaw) 441 (1974); CA83:11296r, (1975).

*Primary Examiner*—Joseph L. Schofer
*Assistant Examiner*—John J. Guarriello
*Attorney, Agent, or Firm*—JoAnn Villamizar

[57] ABSTRACT

Moulding compositions comprising
(a) a melamine/formaldehyde resin, a melamine/phenol/formaldehyde resin or a mixture of said resins,
(b) organic and/or inorganic fillters,
(c) a lubricant, and
(d) 0.1 to 2% by weight, based on on the total composition, of 3-chloro-1,2-propanediol as latent hardener, are suitable for the production of mouldings by injection moulding. The latent hardener employed permits extremely short cycle times coupled with long residence times at the cylinder temperature of the injection moulding machine. The moulding compositions are distinguished at the same time by very good flow properties.

9 Claims, No Drawings

LATENT HARDENERS FOR MELAMINE RESIN MOULDING COMPOSITIONS

The present invention relates to injection moulding compositions based on melamine resins which contain 3-chloro-1,2-propanediol as latent hardener, to the use of said compositions for the production of mouldings by injection moulding, and to the mouldings so obtained.

Moulding compositions based on melamine/formaldehyde resin (MF resin) are well known and have been in wide use for many years. It has, however, proved difficult to prepare compositions suitable for injection moulding. What is required for this utility are moulding compositions which are preferably inert at the processing temperatures during compounding as well as at the customary temperatures in the cylinder of the injection moulding machine and thereby have a long pot-life, but which at the same time harden as rapidly as possible at the mould temperature of the injection moulding machine and thus permit brief cycle times and an economical production of mouldings.

Many so-called "latent", acid liberating hardeners for curing melamine resins are known, but none meets the requirements in a wholly satisfactory manner: either the moulding compositions have insufficient stability or the action of the hardener in the mould is too slow. A further disadvantage is the resultant impaired flow properties of the moulding composition. Some of the known hardeners are also hazardous for toxicological reasons, as toxic products, for example, form during curing.

Specifically, the invention relates to moulding compositions comprising
(a) a melamine/formaldehyde resin, a melamine/phenol/formaldehyde resin or a mixture of said resins,
(b) organic and/or inorganic fillers,
(c) a lubricant, and
(d) 0.1 to 2% by weight, based on the total composition, of 3-chloro-1,2-propanediol as latent hardener.

The latent hardener used in this invention imparts to the moulding compositions the desired properties for processing by injection moulding and permits extremely short cycle times coupled with long residence times at the cylinder temperature of the injection moulding machine. In addition, the moulding compositions are distinguished by very good flow properties.

3-Chloro-1,2-propanediol is also known as glycerol-α-monochlorohydrin and is described, for example, in Kirk-Othmer, Encyclopedia of Chemical Technology, Volume 5, p. 854 et seq. (3rd edition, 1979, Wiley Interscience). The product is also commercially available. Thus it is also recommended by Shell Fine Chemicals, London (Technical Bulletin, FC:64:1:TB, 2nd Edition) as a versatile intermediate for use in the pharmaceutical industry, in the polymer industry, in textile and metal processing, as well as for miscellaneous applications. One of the different utilities mentioned in the polymer industry is also as a catalyst for melamine moulding materials, but without any further particulars being given in this regard.

The use of reaction products of melamine and formaldehyde as brightening agents in the electrodeposition of zinc from alkaline electrodepositing baths is disclosed in U.S. Pat. No. 3,745,099. The melamine resins soluble in the electrodepositing baths can also be prepared, for example, in the presence of large amounts of glycerol-α-monochlorohydrin (preferably 1.5 to 3.5 mol per mol of melamine).

Glycerol-α-monochlorohydrin phenyl ether, together with other compounds, is described as a catalyst for the curing of melamine moulding compositions by Z. Wirpsza et al., in Polimery (Warsaw), 1974, 19(9), 441–443.

Glycerol dichlorohydrin (1,3-dichloro-2-propanol) is also disclosed as a hardener for curing melamine/formaldehyde resins in the production of laminates in U.S. Pat. No. 2,930,727.

Latent hardeners for acid-catalysed reactions, for example also for curing urea/formaldehyde, melamine/formaldehyde or phenol/formaldehyde resins of formula

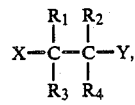

wherein X is the residue of a strong acid, for example of hydrochloric acid, and Y is a Lewis base moiety, are disclosed in U.S. Pat. No. 3,317,474. The moiety Y may contain nitrogen, oxygen or sulfur atoms, while residues of amines are preferred and disclosed as sole Lewis base moieties.

Suitable melamine/formaldehyde resins or melamine/phenol/formaldehyde resins are all representative resins which are known per se to the person skilled in the art of resin technology. The resins are ordinarily prepared by condensing melamine, formaldehyde and, where appropriate, phenol, in aqueous alkaline medium. After the condensation, the resin is dried, i.e. excess water is removed. The resin can then be used, for example, in the form of resin flakes in the moulding composition. The molar ratio of melamine to formaldehyde in the resins is, for example, in the range from 1:1.5 to 1:3, preferably from 1:1.5 to 1:2.5. The most preferred resins are those in which the molar ratio of melamine to formaldehyde is in the range from 1:1.6 to 1:2.

If the resin is a ternary melamine/phenol/formaldehyde resin, it is preferred to use resins which contain 0.1 to 0.4 mol, preferably 0.15 to 0.20 mol, of phenol per mol of melamine.

The moulding compositions of this invention preferably contain 35 to 70% by weight, more particularly 45 to 55% by weight, of the melamine resin (a), based on the total weight of the composition. The resin preferably has a molecular weight of less than 5000, most preferably of up to 2000.

The moulding compositions of this invention contain organic or inorganic fillers, or preferably both organic and inorganic fillers. As fillers it is in principle possible to use all insoluble solid substances which are in finely particulate or fibrous state and do not chemically impair the resins. Examples of preferred organic fillers are wood flour and, in particular, cellulose. Depending on the requirements, the moulding compositions may contain only wood flour, only cellulose, or also both fillers. The amount of organic filler is preferably 0 to 40% by weight, most preferably 20 to 30% by weight, based on the total composition.

Examples of suitable inorganic fillers are calcium carbonate, for example as chalk or calcite, barium sulfate, lithopone, alumina, silicates such as talcum, mica, kaolin or wollastonite, glass beads and the like. Particularly preferred inorganic fillers are lithopone, calcium carbonate, barium sulfate and kaolin. The fillers may be used singly or also in admixture. The moulding compositions of this invention may also contain reinforcing fillers such as glass fibres. The inorganic fillers are preferably used in amounts of 0 to 30% by weight, most preferably of 10 to 25% by weight, based on the total composition.

The total amount of organic and inorganic fillers is preferably less than 60% by weight, most preferably less than 50% by weight, of the total composition.

The moulding compositions of this invention contain a lubricant as component (c). All lubricants commonly employed for melamine moulding compositions may suitably be used, for example waxes, stearic acid or metal salts thereof such as zinc stearate, aluminium stearate, magnesium stearate or calcium stearate, or monohydric or polyhydric alcohols such as glycerol. Preferred lubricants (c) are calcium stearate or zinc stearate. The amount of lubricant is preferably 0.2 to 2% by weight, most preferably 0.4 to 0.8% by weight, based on the entire composition.

Preferred moulding compositions are those comprising 35 to 70% by weight, preferably 45 to 55% by weight, of component (a), 0 to 40% by weight, preferably 20 to 30% by weight, of organic filler (b), and 0 to 30% by weight, preferably 10 to 25% by weight, of inorganic filler (b), 0.2 to 2% by weight, preferably 0.4 to 0.8% by weight of lubricant (c), and 0.2 to 1.5% by weight, preferably 0.3 to 1.2% by weight and, most preferably, 0.5 to 1.0% by weight, of hardener (d), based on the entire composition.

In addition to components (a) to (d), the moulding compositions of this invention may contain, for example, dyes, pigments, reinforcing agents and/or resins other than melamine resins. Additional resins other than melamine resins are, for example, unsaturated polyesters or acrylic resins.

The moulding compositions of this invention are particularly suitable for the fabrication of electrical components such as electrical insulating material, circuit components, switch boxes, and power safety switches, as well as parts of household articles such as handles, control knobs and lamp casings.

The moulding compositions can conveniently be prepared by mixing together all components, if desired at elevated temperature, for example in the temperature range from 80°–120° C., in a Ko-kneader, and subsequently grinding or granulating the mixture.

The moulding compositions are suitable for processing by injection moulding. Whereas the conventional hardeners for curing melamine resins react already at cylinder temperatures of 100° to 120° C. and permit a maximum residence time of only ca. 5 to 10 minutes, the use of 3-chloro-1,2-propanediol as latent hardener in the practice of this invention makes it possible to achieve residence times of well over 60 minutes. In addition, on account of their stability the otherwise conventional addition of buffers such as sodium oxalate or sodium p-toluenesulfonate, of inhibitors such as borax, or of stabilisers such as triethanolamine, to the moulding compositions of this invention is not necessary. On the other hand, the onset of reaction at mould temperatures in the range from ca. 160°–190° C. is very rapid, so that the composition is cured very rapidly and short to extremely short curing times (for example only 15 sec) are possible in processing by injection moulding. In addition, the viscosity as well as the flow properties can be adjusted almost freely when processing the composition.

The invention therefore also relates to the use of the moulding compositions for the production of mouldings by injection moulding at mould temperatures in the range from 150° to 200° C., preferably from 165° to 190° C. and, most preferably, from 170° to 180° C.

The invention further relates to the use of the moulding compositions for the production of mouldings by injection moulding at cycle times of 20 to 50, preferably from 25 to 35, seconds.

The invention relates further still to the mouldings which are produced by injection moulding.

The following Examples illustrate the invention in more detail.

PREPARATION OF THE MOULDING COMPOSITIONS

The given amount of MF or MPF resin flakes is mixed in a Henschel mixer with the fillers, the lubricant, the hardener and further optional components. This premix is kneaded in a laboratory kneader at 90°–100° C. and then ground in a toothed-disc mill.

PROCESSING AND DETERMINING THE PROPERTIES OF THE MOULDING COMPOSITIONS

After determining the water content and flow/curing properties (Brabender), the injection moulding behaviour is investigated at a cylinder temperature ($T_{cyl}$) of 90°/100° C. and a mould temperature ($T_{mld}$) of 170°/175° C. (Example 2, $T_{mld}$=180°/185° C.).

The curing time is determined from an injection moulded switch cover (ca. 8×8 cm) at Shore D=77–80.

The residence time in the cylinder denotes the time taken until the composition is cured while remaining in the cylinder.

EXAMPLE 1

1750 kg (50%) of MF basic resin (M:F = 1:2)
980 kg (28%) of cellulose
280 kg (8%) of lithopone
460 kg (15%) of chalk
14 kg (0.4%) of calcium stearate
7 kg (0.2%) of zinc stearate
9 kg (0.26%) of 3-chloro-1,2-propanediol
water content: 3.2%
Brabender B value: 7.0 Nm
Brabender D value: 267 s curing time: 30 s
residence time in the cylinder: > 60 min

EXAMPLE 2

Example 1 is repeated, raising the mould temperature by 10° C., i.e. to $T_{mld}$=180°/185° C. In this case, the curing time (with no change in the residence time in the cylinder) is reduced from 30 s to 20 s.

EXAMPLE 3

Example 1 is repeated, increasing the amount of hardener to 36 kg (1.02%) of 3-chloro-1,2-propanediol. Remainder of composition as in Example 1.

water content: 3.5%
Brabender B value: 7.0 nm

EXAMPLE 4

| |
|---|
| 1460 kg (50%) of MF basic resin (M:F = 1:2) |
| 850 kg (28%) of cellulose |
| 360 kg (12%) of lithopone |
| 270 kg (9%) of barium sulfate |
| 10 kg (0.4%) of calcium stearate |
| 6 kg (0.2%) of zinc stearate |
| 35 kg (1.17%) of 3-chloro-1,2-propanediol |
| water content: 4.4% |
| Brabender B value: 6.0 Nm |
| Brabender D value: 174 s | curing time: 14 s
residence time in the cylinder: > 60 min

EXAMPLE 5

| |
|---|
| 1640 kg (55%) of MF basic resin (M:F = 1:2) |
| 670 kg (22%) of cellulose |
| 360 kg (12%) of lithopone |
| 270 kg (9%) of kaolin |
| 12 kg (0.4%) of calcium stearate |
| 6 kg (0.2%) of zinc stearate |
| 35 kg (1.17%) of 3-chloro-1,2-propanediol |
| water content: 4.0% |
| Brabender B value: 5.0 Nm |
| Brabender D value: 194 s | curing time: 22 s
residence time in the cylinder: > 60 min

EXAMPLE 6

| |
|---|
| 1745 kg (50%) of MPF basic resin (M:P:F = 1:0.17:2.5) |
| 970 kg (28%) of cellulose |
| 350 kg (10%) of lithopone |
| 350 kg (10%) of chalk |
| 14 kg (0.4%) of calcium stearate |
| 7 kg (0.2%) of zinc stearate |
| 35 kg (1.0%) of 3-chloro-1,2-propanediol |
| water content: 3.4% |
| Brabender B value: 10.0 Nm |
| Brabender D value: 172 s | curing time: 24 s
residence time in the cylinder: > 50 min

What is claimed is:

1. An injection moulding composition comprising
   (a) a melamine/formaldehyde resin, a melamine/phenol/formaldehyde resin or a mixture of said resins,
   (b) organic and/or inorganic fillers,
   (c) a lubricant, and
   (d) 0.1 to 2% by weight, based on the total composition, of 3-chloro-1,2-propanediol as latent hardener.

2. A moulding composition according to claim 1, wherein the molar ratio of melamine to formaldehyde in component (a) is in the range from 1:1.5 to 1:2.5.

3. A moulding composition according to claim 2, wherein the molar ratio of melamine to formaldehyde is in the range from 1:1.6 to 1:2.

4. A moulding composition according to claim 1, wherein the melamine/phenol/formaldehyde resin contains 0.1 to 0.4 mol, of phenol per mol of melamine.

5. A moulding composition according to claim 1, wherein the organic filler (b) is cellulose and/or wood flour.

6. A moulding composition according to claim 1, wherein the inorganic filler (b) is lithopone, calcium carbonate, barium sulfate or kaolin.

7. A moulding composition according to claim 1, wherein the lubricant (c) is calcium stearate or zinc stearate.

8. A moulding composition according to claim 1, which comprises 35 to 70% by weight of component (a), 0 to 40% by weight of organic filler (b), and 0 to 30% by weight of inorganic filler (b), 0.2 to 2% by weight of lubricant (c), and 0.2 to 1.5% by weight of hardener (d), based on the entire composition.

9. A moulding composition according to claim 1, which, in addition to containing components (a) to (d), further contains dyes, pigments, reinforcing agents and/or resins other than melamine resins.

* * * * *